United States Patent [19]

Yoshida

[11] Patent Number: 5,049,830

[45] Date of Patent: Sep. 17, 1991

[54] CARRIER RECOVERY SYSTEM AND DIGITAL PHASE DEMODULATOR

[75] Inventor: Shousei Yoshida, Tokyo, Japan

[73] Assignee: NEC Corp., Japan

[21] Appl. No.: 581,892

[22] Filed: Sep. 13, 1990

[30] Foreign Application Priority Data

Sep. 13, 1989 [JP] Japan .................................. 1-237855
Oct. 31, 1989 [JP] Japan .................................. 1-283971

[51] Int. Cl.$^5$ ............................................ H04L 27/22
[52] U.S. Cl. .................................... 329/306; 329/346; 375/83; 375/96; 375/118
[58] Field of Search ............... 329/304, 310, 345, 346, 329/306; 375/80, 83, 85, 86, 87, 110, 118, 119, 96

[56] References Cited

U.S. PATENT DOCUMENTS 4,328,587  5/1982  Mizuno et al. ..................... 375/83 X
4,581,586  4/1986  Rubin ................................ 375/83 X

OTHER PUBLICATIONS

Gardner, Floyd M., Ph.D, *Phaselock Techniques*, 2nd Edit., John Wiley & Sons, Inc., 1979, pp. 217–225.
Schwartz, Mischa et al., *Communication Systems and Techniques*, McGraw-Hill, Inc., 1966, pp. 372–374.
Viterbi, Andrew J. et al., *IEEE Transactions on Information Theory*, vol. IT-29, No. 4, Jul. 1983, pp. 543–551.

*Primary Examiner*—Siegfried H. Grimm
*Attorney, Agent, or Firm*—Ostrolenk, Faber, Gerb & Soffen

[57] ABSTRACT

A carrier recovery system combining a narrow band carrier phase estimator and a wide band carrier phase estimator, and a digital phase demodulator using this carrier recovery system. The narrow band carrier phase estimator extracts a carrier phase having a low pulse slip rate from received signal. This carrier phase, however, cannot track fast phase fluctuation due to fading. On the other hand, the wide band carrier phase estimator tracks fast phase fluctuation due to fading, and extracts a carrier phase from the received signal. From this carrier phase is subtracted the other carrier phase obtained by the narrow band carrier phase estimator, and the balance, after its fluctuating range is limited, is added to the carrier phase obtained by the narrow band carrier phase estimator, thereby making it possible to obtain a carrier phase which can track fast phase fluctuations due to fading without sacrificing the phase slip rate. By using the carrier phase obtained in this manner, there can be structured a digital phase demodulator suitable for mobile communication systems based on coherent detection. If carrier component is extracted by reversely modulating the received signal with reference signal obtained by subjecting to decision the signal demodulated by this digital phase demodulator, a carrier phase is recovered by filtering the extracted carrier component in a wide band, and the received signal is synchronously detected with this carrier phase, the error rate can be further reduced.

5 Claims, 3 Drawing Sheets

CARRIER RECOVERY SYSTEM AND DIGITAL PHASE DEMODULATOR

BACKGROUND OF THE INVENTION

The present invention relates to a carrier recovery system for use in a mobile communication system, and more particularly to the carrier recovery for application to a digital phase demodulator for demodulating digital phase-modulated signals by coherent detection in a mobile communication system.

Some digital phase demodulators for demodulating digital phase-modulated signals use coherent detection while others use differential detection. A digital phase demodulator using coherent detection recovers the carrier phase from received signals, generates a reference carrier signal, and coherently detects the received signal with the reference carrier signal.

A phase lock loop (PLL), such as the Costas loop, is frequently used for carrier phase recovery (see F. M. Gardner, Phaselock Techniques, New York: John Wiley & Sons, 1979, pp. 217-225). In order to prevent the degradation of the bit error rate due to phase jitters at a low carrier to-noise power ratio (C/N), the loop noise bandwidth of the PLL should be kept sufficiently narrow, somewhere between 1/50 and 1/200 of the modulation rate.

A carrier phase recovery system employing a PLL, because of the long acquisition time the loop takes to enter into a stable state after the first received signal inputting, is unsuitable for a time-division multiple-access (TDMA) system for burst signal transmission or a mobile communication system in which signal interruptions frequently occur.

There are also known open loop systems by which received signals are nonlinearly processed to extract the carrier component and the phases of the extracted carrier components are averaged over time to recover the original carrier phase. These systems take no long acquisition time and, moreover, the aquisition time is constant irrespective of the input phase condition. Yet, they require a long enough phase averaging time, or in other words a narrow enough bandwidth for the filter to achieve phase averaging. The operation of such open loop carrier phase recovery systems is analyzed in detail by A. J. Viterbi et al. (A. J. Viterbi, A. M. Viterbi, "Nonlinear Estimation of PSK-Modulated Carrier Phase with Application to Burst Digital Transmission", IEEE Transactions on Information Theory, vol. IT-29, No. 5, pp. 543-551, July, 1983).

In a terrestrial mobile communication system or a satellite-based land-mobile communication system, multipath fading takes place with the motion of the mobile terminal as a consequence of multiple reflections from topographies or buildings. Since the amplitude phase distribution of signals affected by this fading can be approximated by the Rice model, which is the amplitude phase distribution of the synthetic signals of direct-path and multipath waves (M. Schwartz, W. R. Bennet, S. Stein, Communication Systems and Techniques, New York: McGraw-Hill, 1966, pp. 372-374), this multipath fading is known as the Rice fading.

The range of the spectrum due to this fading, i.e. the fading pitch, is determined by the frequency of the carrier used and the velocity of the mobile terminal. If, for instance, the carrier frequency is 1.5 GHz and the maximum speed of the mobile terminal is 120 km/h, the fading pitch will be about 200 Hz at the maximum.

Meanwhile, supposing that speech signals are transmitted after being encoded into high efficiency codes and further into error-corrected codes and quarternary phase shift keying (QPSK) is used for modulation, the modulation rate will be, say, 3.2 kbaud. If, in this case, the bandwidth of the PLL loop, or that of the filter for phase averaging, in a carrier phase recovery system is selected between 1/50 and 1/200 of the modulation rate, the bandwidth will be 64 Hz to 16 Hz, considerably narrower than the maximum fading pitch. Accordingly, the recovered carrier phase will be unable to track the phase of the received carrier affected by fading. As a result, the fast phase fluctuation the received carrier was subjected to by the fading will become phase errors of the recovered carrier. Therefore, if the received signal is demodulated with reference to this recovered carrier phase, it results in serious bit error rate degradation.

On the other hand, digital phase demodulators using differential detection, which are known to be relatively suitable for use in a fading environment, not only are intrinsically inferior in the bit error rate to those using coherent detection by 2 to 3 dB but also cannot avoid more degradation of the bit error rate in an environment where so fast phase fluctuations are invited by fading that the phase varies even within a bit period. In the worst conceivable fading environment for the operation of such a system, where the direct-path carrier to-multipath power ratio (C/M) is 7 to 10 dB and the fading pitch is about 1/16 of the modulation rate as referred to above, there will be no substantial difference in the bit error rate between differential detection and coherent detection.

As described above, digital phase demodulators by the prior art have nothing to compensate for the relatively fast phase fluctuations which arise in the Rice fading environment and are too great to be ignored.

SUMMARY OF THE INVENTION

An object of the invention, therefore, is to provide a carrier recovery system improved in compliance with fast phase fluctuations.

Another object of the invention is to provide a digital phase demodulator suitable for use in a mobile communication system.

Still another object of the invention is to provide a carrier recovery system and a digital phase demodulator capable of signal processing by digital operation and permitting ready circuit integration.

According to the present invention, a carrier recovery system for generating a recovered carrier signal from a received input signal comprises a first carrier recovering circuit responsive to the received input signal for generating a first phase signal during a first predetermined period of time, a second carrier recovering circuit responsive to the received input signal for generating a second phase signal during a second predetermined period of time, which is shorter than the first predetermined period of time, and a phase combining circuit for determining phase deviation of the second phase signal from the first phase signal and generating the recovered carrier signal in response to the first phase signal and the phase deviation.

BRIEF DESCRIPTION OF THE DRAWINGS

The above-mentioned and other objects, features and advantages of the present invention will become more apparent from the following detailed description when taken in conjunction with the accompanying drawings, wherein.

DETAILED DESCRIPTION OF THE PREFERRED EMBODIMENTS

Figure 1:
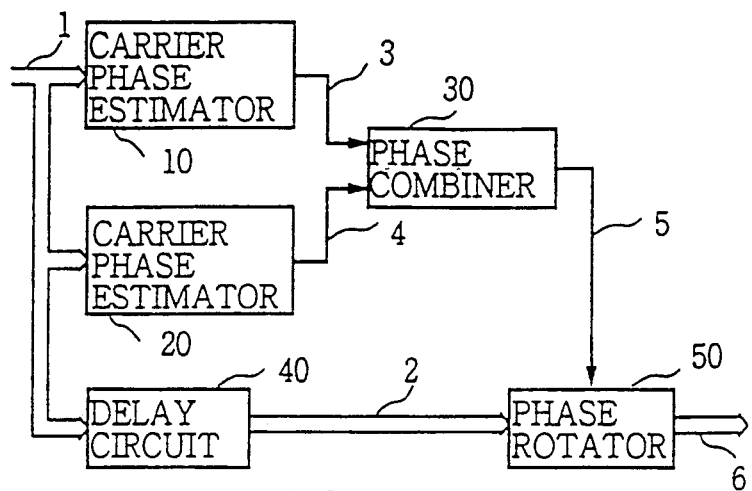
FIG. 1 is a schematic block diagram illustrating a digital phase demodulator using the carrier recovery system of the invention by way of its first preferred invention.

Referring to FIG. 1, a digital phase demodulator using the carrier recovery system according to the present invention comprises a first carrier phase estimator 10, a second carrier phase estimator 20, a phase combiner 30, a delay circuit 40 and a phase rotator 50. In FIG. 1, the first and second carrier phase estimators 10 and 20 and the phase combiner 30 constitute the carrier recovery system according to the invention.

A receive signal, which is a quadrature (or complex) signal, is supplied from an input signal line 1, fed to the phase rotator 50 by a signal line 2 via the delay circuit 40, and supplied as the demodulated signal of the quadrature signal from an output signal line 6. The first and second carrier phase estimators 10 and 20 send their outputs over signal lines 3 and 4, respectively, for real number signals to the phase combiner 30, whose output is supplied to the phase rotator 50 over another signal line 5 for real number signals. Similarly in FIG. 2 and thereafter, double lines represent paths for quadrature signals and single lines, paths for real number signals.

In the digital phase demodulator shown in FIG. 1, the first carrier phase estimator 10 receives from the input signal line 1 digital phase-modulated signals transmitted in a Rice fading environment. The estimator 10 extracts carrier components from the received signal, and subjects the extracted carrier component to phase averaging operation. The averaged carrier component is supplied to the phase combiner as a first carrier component. This phase averaging operation is achieved by narrow-band filtering. The bandwidth of this filtering is set about equal to the noise bandwidth of the PLL in the conventional carrier recovery system, somewhere between 1/50 and 1/200 of the modulation rate of the received signal. This filtering improves the C/N ratio of the first carrier component, whose phase slip rate is significantly reduced, too. Since this filtering achieves phase averaging over a relatively long period of time, phase jitters due to noise in the first carrier component are sufficiently reduced, but the fast phase fluctuation due to fading is also averaged. Therefore, the phase of the first carrier component cannot track the fast phase fluctuation due to fading.

Meanwhile, the second carrier phase estimator 20 also extracts carrier component from the received signal supplied from the input signal line 1, and subjects the extracted carrier component to phase averaging operation. The averaged carrier component is supplied to the phase combiner 30 as a second carrier component. This operation is achieved by wide-band filtering. The bandwidth of this filtering is set about equal to or somewhat wider than the maximum fading pitch. Since this filtering achieves phase averaging over a relatively short period of time, the phase of the second carrier component tracks the fast phase fluctuation due to fading, but jitter due to noise in the carrier component is relatively great.

The phase combiner 30 determines the deviation of the phase of the second carrier component from that of the first carrier component, and adds the determined deviation, after limiting the range of its fluctuation, to the phase of the first carrier component. The deviation is the phase deviation of the second carrier component with reference to the first carrier component whose phase is sufficiently cleared of phase fluctuation due to noise or fading. This deviation, therefore, contains relatively great phase jitter due to noise and fast phase fluctuation by fading. By limiting the fluctuating range of the deviation, phase slips due to noise-attributable phase jitters can be prevented. Consequently, the phase outputted by the phase combiner 30 can track fading-invited phase fluctuation within the limited range of phase fluctuation, and its slip rate is sufficiently low. What is important here is that the fluctuating range of the deviation is limited after it is determined. Phase slips cannot be prevented by directly processing the second carrier component.

The delay circuit 40 delays the received signal by the response time from the inputting of the received signal to the first and second carrier phase estimators 10 and 20 till the phase recovery by the phase combiner 30. The phase rotator 50 gives a phase rotation to the signal from the delay circuit 40 by the phase of the output of the phase combiner 30. The phase rotator 50 outputs the demodulated signal.

The digital phase demodulator illustrated in FIG. 1 will now be described in further detail with reference to FIGS. 2 to 5 together.

Figure 2:
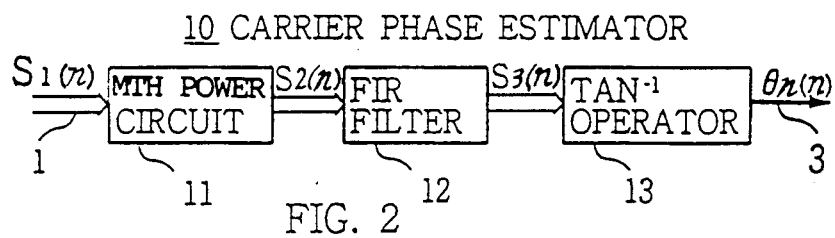
FIG. 2 is a schematic block diagram illustrating details of the carrier phase estimator 10 in FIG. 1.

Referring to FIG. 2, the first carrier phase estimator 10 consists of an Mth-power operating circuit 11, a finite impulse response (FIR) filter 12 and an arc tangent ($\tan^{-1}$) operator 13.

Signals entered into the Mth-power circuit 11 are composed of a sampled data sequence obtained by sampling two quadrature components of the M-phase phase-modulated received signal at a bit timing. The Mth-power circuit 11 removes the modulation of the input signal by multiplying their frequency by M, the number of modulating phases for the received signal. In usual Mth-power operation, both amplitude and phase are multiplied in the Mth-power. In the present invention, the Mth-power circuit 11 multiplies only the phase, while keeping intact the amplitude, of the input signal and outputs the resultant phase-multiplied signal. Therefore, if the input signals $S_1(n)$ are represented by:

$$S_1(n) = I_1(n) + jQ_1(n) = \uparrow S_1(n) \uparrow \exp\{j\theta_1(n)\} \quad (1)$$

where $\uparrow S_1(n) \uparrow = \sqrt{I_1(n)^2 + Q_1(n)^2}$, the output signal $S_2(n)$ of the Mth-power circuit 11 can be represented by:

$$S_2(n) = \uparrow S_1(n) \uparrow \exp\{jM\theta_1(n)\} = I_2(n) + jQ_2(n) \quad (2)$$

In the Mth-power operation, keeping the amplitude of the output signal equal to that of the input signal is intended to minimize nonlinear loss. This aspect is analyzed in detail in the article by A. J. Viberbi et al. referred to above.

The FIR filter 12 is a narrow-band carrier filter to keep the phase slip rate low by improving the C/N of the carrier component, which is the output signal $S_2(n)$ of the Mth-power circuit 11. The FIR filter 12 is composed of a transversal filter. The number of taps of the FIR filter 12 being represented by $N_1$ and its tap coefficients, by $C(i)$ ($-(N_1-1)/2 \leq i \leq (N_1-1)/2$), the output signal $S_3(n)$ of the FIR filter 12 is represented by the following equation.

$$S_3(n) = \sum_{k=n-(N_1-1)/2}^{n+(N_1-1)/2} C(n-k)S_2(k) \quad (3)$$

At this time, the bandwidth of the FIR filter 12 is $1/(N_1T_b)$, where $T_b$ is the modulation period of received signal, so that the bandwidth of the FIR filter 12 is set between 1/50 and 1/200 of the modulation rate $1/T_b$ by setting the tap number $N_1$ between 50 and 200. Further, L 10 by setting all the tap coefficients $C(i)$ to $1/N_1$, the impulse response of the FIR filter 12 becomes rectangular. Thus, the operation load can be reduced and ideal phase averaging operation can be achieved.

The $\tan^{-1}$ operator 13 converts the output signal $S_3(n)$ into its phase $\theta_n(n)$, and outputs the converted signal to the signal line 3 as the first carrier component.

Figure 3:
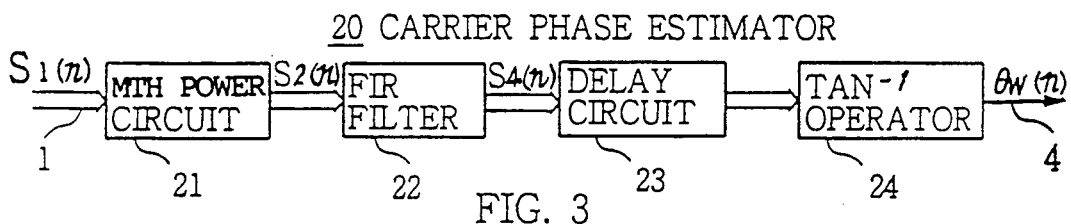
FIG. 3 is a schematic block diagram illustrating details of the carrier phase estimator 20 in FIG. 1.

Referring now to FIG. 3, the second carrier phase estimator 20 consists of an Mth-power operation circuit 21, an FIR filter 22, a delay circuit 23 and a $\tan^{-1}$ operator 24.

The Mth-power circuit 21 extracts carrier component $S_2(n)$ from the input signal $S_1(n)$ by the same operation as the Mth-power circuit 11 in the first carrier phase estimator 10. Therefore, it is permissible to enter the output signals of either one of the Mth-power circuits 11 and 21 into the FIR filters 12 and 22 and dispense with those of the other Mth-power circuit.

The FIR filter 22 is a wide-band carrier filter to improve the C/N of the output signal $S_2(n)$, which is the carrier component, and tracks fast phase fluctuation due to fading. The FIR filter 22, too, is composed of a transversal filter. The number of taps of the FIR filter 22, represented by $N_2$, is so set as to make the bandwidth $1/(N_2T_b)$ about equal to or somewhat greater than the maximum fading pitch. If, for instance, the maximum fading pitch is approximately 1/16 of the modulation rate $1/T_b$ of the received signal, the tap number $N_2$ is set to or slightly smaller than 16. The impulse response of the FIR filter 22 is also made rectangular for the same reason as for the FIR filter 12, namely, all the tap coefficients are set to $1/N_2$.

The output signal $S_4(n)$ of the FIR filter 22 passes through the delay circuit 23 and enters into the $\tan^{-1}$ operator 24 which converts the input signal $S_4(n)$ into its own phase $\theta_w(n)$ and outputs the converted signal to the signal line 4 as the second carrier component. The delay circuit 23 so adjusts the response time difference $(N_1-N_2)T_b/2$ between the FIR filters 12 and 22 as to make the $\tan^{-1}$ operators 14 and 23 output phases $\theta_n(n)$ and $\theta_w(n)$, respectively, at the same timing.

Figure 4:
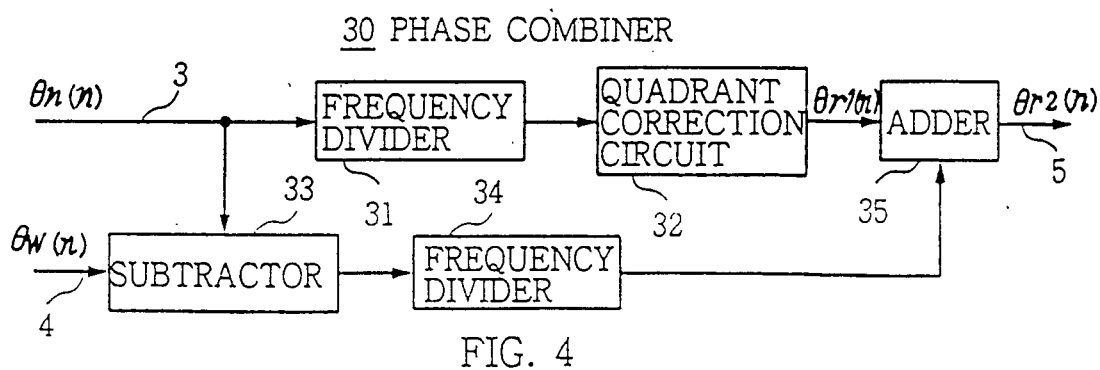
FIG. 4 is a schematic block diagram illustrating details of the phase combiner 30 in FIG. 1.

Referring to FIG. 4, the phase combiner 30 comprises a frequency M-divider 31, a quadrant correction circuit 32, a subtractor 33, another frequency M-divider 34 and an adder 35.

The frequency M-divider 31 divides the phase $\theta_n(n)$ of the first carrier component entered from the $\tan^{-1}$ operator 13 (FIG. 2) via the signal line 3 by the modulation phase number M of the received signal. The quotient is limited within the range of $\pm \pi/M$. The quadrant correction circuit 32 finds out the rotating direction of the phase $\theta_n(n)$ by observing the quantity of variation between the phase $\theta_n(n)$ and the phase $\theta_n(n-1)$ which is one symbol earlier, and expands the range of the phase $\theta_n(n)/M$ from the frequency M-divider 31 to $\pm \pi$ on the basis of this rotating direction. This expansion of the phase range can be represented by the following equation.

$$\theta_{r1}(n) = \text{mod}\{\theta_n(n)/M + 2\pi i(n)/M, 2\pi\} \quad (4)$$

where $\theta_{r1}(n)$ is the phase outputted from the quadrant correction circuit 32 after its range is expanded, and $i(n)$ is represented as follows:

$$\begin{aligned} i(n) &= \text{mod }\{i(n-1) - \text{sign }[\theta_n(n) - \theta_n(n-1), 1], M\} \\ &\quad \text{if } |\theta_n(n) - \theta_n(n-1)| > \pi \\ &= i(n-1) \\ &\quad \text{if } |\theta_n(n) - \theta_n(n-1)| \leq \pi \end{aligned}$$

Sign $[\alpha, 1]$ is a function which takes the value of $+1$ if $\alpha$ is positive, or $-1$ if it is negative.

The subtractor 33 outputs the deviation of the phase $\theta_w(n)$ from the phase $\theta_n(n)$ by subtracting the output phase $\theta_n(n)$ of the $\tan^{-1}$ operator 13 from the output phase $\theta_w(n)$ of the $\tan^{-1}$ operator 24 (FIG. 3), entered via the signal line 4. The frequency M-divider 34 divides the deviation supplied by the subtractor 33 by the modulating phase number M. Although the quotient is limited within the range of $\pm \pi/M$, the output phase of the frequency M-divider 34 is not expanded to the range of $\pm \pi$ to prevent phase slips.

The adder 35 adds the phase $\theta_{r1}(n)$ from the quadrant correction circuit 32 and the phase from the frequency M-divider 34. The sum $\theta_{r2}(n)$ is:

$$\theta_{r2}(n) = \text{mod}\{\theta_{r1}(n) + \text{mod }[\theta_w(n) - \theta_n(n), 2\pi]/M, 2\pi\} \quad (5)$$

The phase $\theta_{r2}(n)$ is the carrier phase recovered from the input signal $S_1(n)$, and is supplied to the phase rotator 50.

Figure 5:
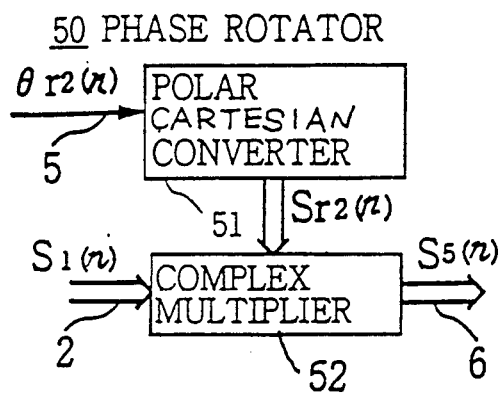
FIG. 5 is a schematic block diagram illustrating details of the phase rotator 50 in FIG. 1; .

Referring now to FIG. 5, the phase rotator 50 comprises a polar-cartesian converter 51 and a complex multiplier 52. The polar-cartesian converter 51 generates reference carrier signals $S_{r2}(n)$ in a quadrature signal form, having as its phase the recovered carrier phase $\theta_{r2}(n)$ from the adder 35. The complex multiplier 52 complexly multiplies the signal $S_1(n)$ supplied from the delay circuit 40 via the signal line 2 and the reference carrier signal $S_{r2}(n)$, and supplies demodulated signals $S_5(n)$ in a quadrature signal form to the signal line 6. Since the response time from the inputting of the input signal $S_1(n)$ to the carrier phase estimators 10 and 20 till the outputting of the reference carrier signals $S_{r2}(n)$ from the polar-cartesian converter 51 is substantially equal to the response time $(N_1-1)T_b/2$, the delay circuit 40 delays the input signal $S_1(n)$ by the time $(N_1-1)T_b/2$ but no more so that the signal $S_1(n)$ and the reference carrier signal $S_{r2}(n)$ be entered into the complex multiplier 52 at the same timing. Incidentally, the $\tan^{-1}$ operators 13 and 24 may as well be arranged within the phase combiner 30.

Figure 6:
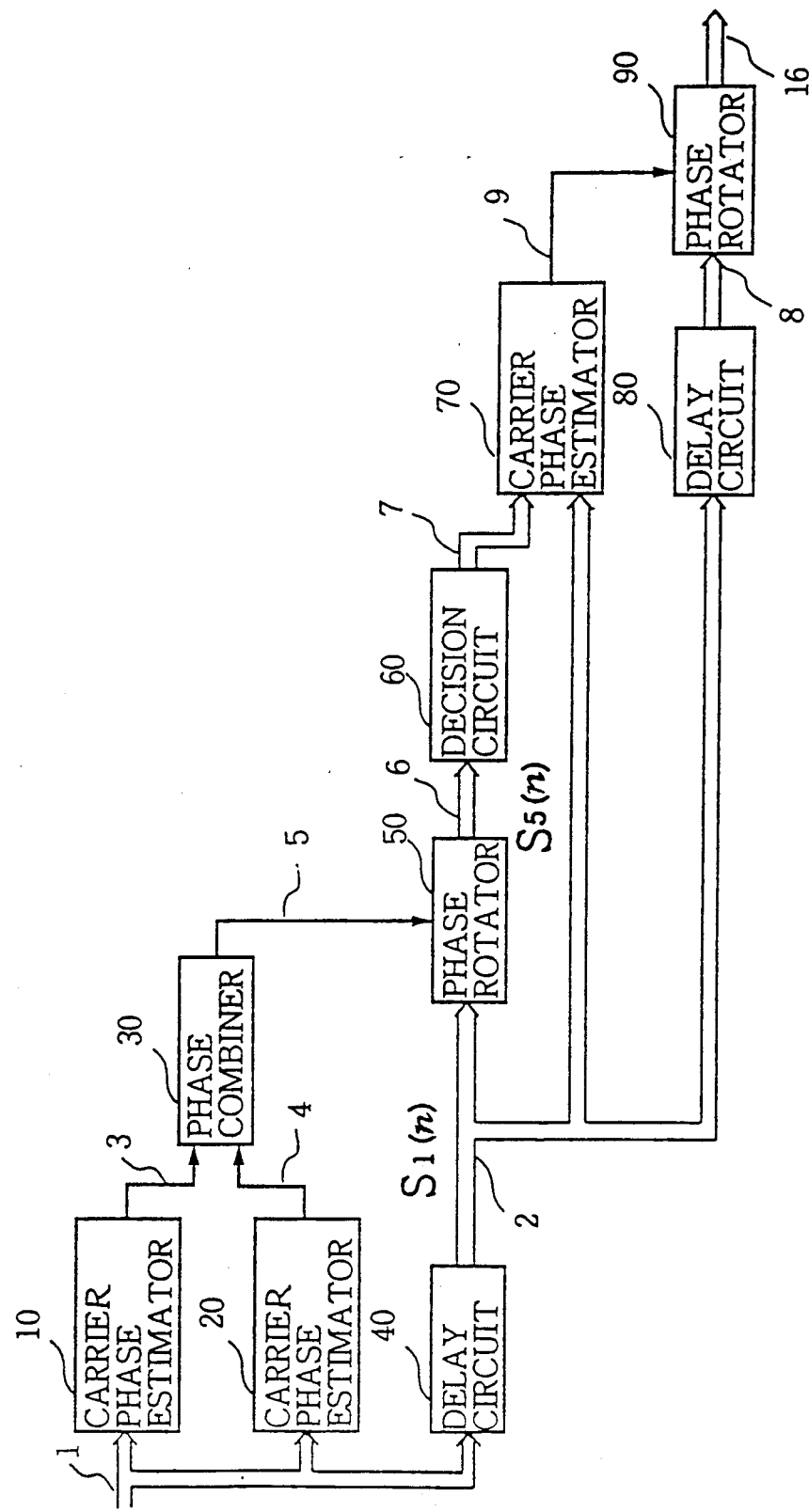
FIG. 6 is a schematic block diagram illustrating a digital phase demodulator using the carrier recovery system of the invention by way of its second preferred invention.

Referring to FIG. 6, a digital phase demodulator which is a second preferred embodiment of the present invention is composed of the digital phase demodulator illustrated in FIG. 1, a decision circuit 60, a carrier phase estimator 70, a delay circuit 80 and a phase rotator 90.

Figure 7:
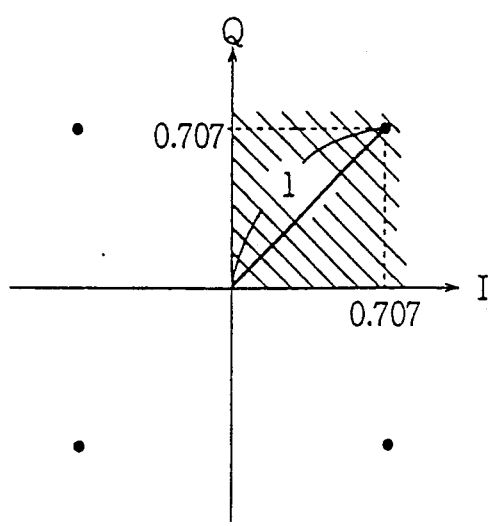
FIG. 7 is a signal space diagram illustrating four reference signal points of signals resulting from the demodulation of four-phase phase-modulated signals, four decision areas, and a set of reference signals corresponding to one of these decision areas.
Figure 8:
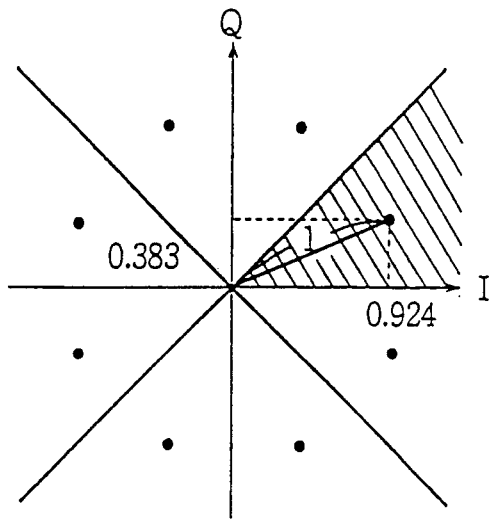
FIG. 8 is a signal space diagram illustrating eight reference signal points of signals resulting from the demodulation of eight-phase phase-modulated signals, eight decision areas, and a set of reference signals corresponding to one of these decision areas.

In the digital phase demodulator shown in FIG. 6, the decision circuit 60 sets decision areas where the error rate is minimized on a complex plane, decides which of the decision areas the signal points of demodulated signals $S_5(n)$ from the phase rotator 50 on the complex plane are contained in. Then, the decision circuit 60 converts the demodulated signal $S_5(n)$ into reference signal of the corresponding decision area, and outputs the converted signal to a signal line 7. Where the modulating phase number M is 4 for instance, the decision circuit 60, as shown in FIG. 7, sets four decision areas corresponding to four reference signal points (each represented by a black dot) of the demodulated signals on the complex plane. If the signal point of the demodulated signal $S_5(b)$ is, for example, in the hatched decision area, the decision circuit 60 decides that the transmitted quadrature signal $I(n)+jQ(n)$ is $0.707+j0.707$, which has the greatest probability of having been transmitted among the four rectangular signals $\pm 0.707 \pm j0.707$, so that the reference signal $0.707+j0.707$ is outputted. In this instance, the area which includes the signal points can be identified by the signs of the real number and imaginary number components of the demodulated signal $S_5(n)$. Therefore, the decision circuit 60 can be composed of two comparators. Where the demodulating phase number M is 8, there are eight decision areas as shown in FIG. 8. If the signal point of the demodulated signal $S_5(n)$ is, for example, in the hatched decision area, the reference signal to be outputted is $0.924+0.383$. In this case, the decision circuit 60 calculates the phase of the demodulated signal $S_5(n)$, and decides, on the basis of the calculated phase, which decision area the signal points are contained in.

Figure 9:
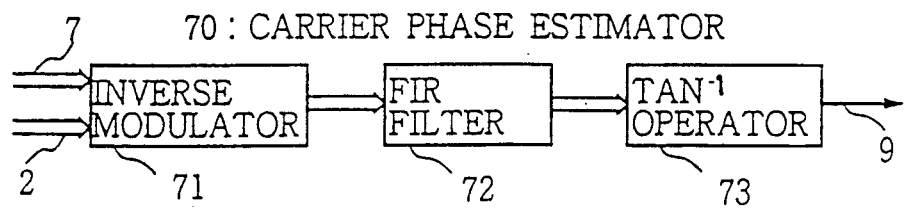
FIG. 9 is a schematic block diagram illustrating details of the carrier phase estimator 70 in FIG. 6.

Referring now to FIG. 9, the carrier phase estimator 70 consists of an inverse modulator 71, an FIR filter 72 and a $\tan^{-1}$ operator 73.

The inverse modulator 71 inversely modulates the signal $S_1(n)$ sent from the delay circuit 40 via the signal line 2 with the reference signal sent from the decision circuit 60 via a signal line 7, and thereby extracts the carrier component. This inverse modulation is achieved by complex multiplication of the conjugate complex signal of the reference signals and the signal $S_1(n)$.

The FIR filter 72 is a wide-band carrier filter which improves the C/N of the carrier component from the inverse modulator 71 and tracks phase fluctuations due to fading. Therefore, the bandwidth of the FIR filter 72 is set about equal to that of the FIR filter 22 in the second carrier phase estimator 20. Thus, the FIR filter 72 may have the same configuration as the FIR filter 22.

The $\tan^{-1}$ operator 73 converts the carrier component, extracted by the inverse modulator 71 and subjected to phase averaging operation by the FIR filter 72, into its own phase and outputs the converted signal to a signal line 9.

Referring again to FIG. 6, the phase rotator 90, having the same configuration as the phase rotator 50, gives a phase rotation to the signals $S_1(n)$, having passed the delay circuits 40 and 80 and sent via a signal line 8, by the output phase of the carrier phase estimator 70. Demodulated signals are supplied from a signal line 16, which is the output line of the phase rotator 90. The delay circuit 80 is used for delaying the output signal of the delay circuit 40 by the time of the delay of carrier component by the FIR filter 72. If the number of taps of the FIR filter 72 is $N_3$, the delay time will be $(N_3-1)T_b/2$. The $\tan^{-1}$ operator 73 of the carrier phase estimator 70 and the polar-cartesian converter (not shown) of the phase rotator 90 are used to keep the amplitude of the output signals of the FIR filter 72 constant. Therefore, these two circuits can be replaced with limiter circuits.

Now, the phase combiner 30 limits the range of the fast fluctuation of phase $\theta_w(n)$ of the recovered carrier obtained by the second carrier phase estimator 20 within $\pm \pi/M$. Therefore, if the fast phase fluctuation due to fading go beyond the range of $\pm \pi/M$, transient phase jumps occur to the recovered carrier phase $\theta_{r2}(n)$ supplied by the phase combiner 30. Reference signal obtained by demodulating the input signals $S_1(n)$ and making decision on the basis of the recovered carrier phase $\theta_{r2}(n)$ involving these phase jumps would be subject to errors. The C/M in the worst fading environment conceivable in practical operation ranges from 7 to 10 dB, and even at this C/M the likely error in the reference signal is considerably small, but not small enough to ignore. Since the inverse modulator 71 inversely modulates the input signal $S_1(n)$ with the reference signal involving errors, the carrier component it provides contains phase jumps. However, since the phase averaging operation by the FIR filter 72 smoothes both phase jitters due to noise and phase jumps, it has the effect to reduce the influence of phase jumps occurring in the phase combiner 30 in the recovered carrier phase supplied by the carrier phase estimator 70. Meanwhile, since no such limitation of the range of fast phase fluctuations as what is performed in the phase combiner 30 takes place in the carrier phase estimator 70, no phase jumps will occur even if fast phase fluctuation due to fading go beyond $\pm \pi/M$.

Therefore, the error rate of the demodulated signal supplied by the phase rotator 90 is somewhat improved over that of the demodulated signal obtained on the output signal line 6 of the phase rotator 50, in other words the output signal of the digital phase demodulator shown in FIG. 1.

As hitherto described, the present invention, by providing first carrier recovering means for obtaining a recovered carrier phase by averaging the phase of carrier component, obtained by nonlinearly operating received signal, over a relatively long period of time; second carrier recovering means for obtaining a recovered carrier phase by averaging the phase of carrier components, obtained by nonlinearly operating received signals, over a relatively short period of time; and phase combining means for adding the deviation of the recovered carrier phase obtained by the second carrier recovering means from that obtained by the first carrier recovering means to the recovered carrier phase obtained by the first carrier recovering means after limiting the fluctuating range of the deviation, can restrain the slipping rate of the recovered carrier phase and, at the same time, improve its compliance with fast phase fluctuations. By synchronous detection of digitally phase-modulated received signal with the recovered carrier phase obtained in this manner, the adaptability of synchronous detection to mobile communication systems, which has been considered less adaptable in a fading environment, can be improved.

If the received signal is demodulated and subjected to decision with the recovered carrier phase supplied by the phase combining means, the carrier component, which is obtained by inversely modulating the received signal with the result of decision, is averaged in phase over a period substantially equal to the phase average by the second carrier recovering means, and the recovered carrier phase thereby obtained is used for synchronous detection of the received signal, the error rate can be further improved.

Since digital operations are used for the processing of signals in different parts of the system according to the present invention, the invention can be realized by combining digital signal processors (DSP's) available as IC's, and there can be provided a compact digital phase demodulator requiring no adjustment and excelling in handling ease.

Although the invention has been described with reference to specific embodiments, this description is not meant to be construed in a limiting sense. Various modifications of the disclosed embodiments, as well as other embodiments of the invention, will become apparent to persons skilled in the art upon reference to the description of the invention. It is therefore contemplated that the appended claims will cover any such modifications or embodiments as fall within the true scope of the invention.

What is claimed is:

1. A carrier recovery system for generating a recovered carrier signal from a received input signal comprising:
    first carrier recovering means responsive to said received input signal for generating a first phase signal during a first predetermined period of time;
    second carrier recovering means responsive to said received input signal for generating a second phase signal during a second predetermined period of time, which is shorter than said first predetermined period of time; and
    phase combining means for determining phase deviation of said second phase signal from said first phase signal and generating said recovered carrier signal in response to said first phase signal and said phase deviation.

2. A carrier recovery system as claimed in claim 1, wherein said phase combining means comprises quadrant correction circuit means for correcting the phase fluctuation range of said first phase signal within a first predetermined range to produce a corrected first phase signal, limiter circuit means for limiting the fluctuation range of said phase deviation within a predetermined range and outputting a limited phase deviation, and adder means for adding said limited phase deviation and said corrected first phase signal to produce said recovered carrier signal.

3. A carrier recovery system as claimed in claim 1, wherein said first carrier recovering means comprises first modulation removing means responsive to said received input signal for removing phase modulation of said received input signal to produce a first modulation removed signal and first averaging circuit means for averaging said first modulation removed signal during said first predetermined period of time and wherein said second carrier recovering means comprises second modulation removing means responsive to said received input signal for removing phase modulation of said received input signal to produce a second modulation removed signal and second averaging circuit means for averaging said second modulation removed signal during said second predetermined period of time.

4. A digital phase demodulation system for generating a demodulated signal from a received input signal comprising:
    first carrier recovering means for receiving said received input signal and for generating a first phase signal during a first predetermined period of time;
    second carrier recovering means for receiving said received input signal and for generating a second phase signal during a second predetermined period of time, which is shorter than said first predetermined period of time;
    phase combining means for determining phase deviation of said second phase signal from said first phase signal, and generating a recovered carrier signal in response to said first phase signal and said phase deviation,
    first delay means for delaying said received input signal by a response time from the inputting of said received input signal to said first and second carrier recovering means till the outputting of the recovered carrier signal by said phase combining means; and
    first phase rotating means for giving a phase rotation by a phase of said recovered carrier signal to the signal from said first delay means and generating a first phase rotated signal as said demodulated signal.

5. A digital phase demodulation system, as claimed in claim 4, further comprising decision means for setting decision areas where an error rate is minimized on a complex plane and for converting said first phase rotated signal into a reference signal in the corresponding one of said decision areas; and
    third carrier recovering means for subjecting a carrier component, obtained by reversely modulating a signal from said first delay means with said reference signal from the decision means, to a phase averaging operation for a third predetermined period of time predetermined to be substantially equal to said second predetermined period of time; and
    second delay means for delaying a signal from said first delay means by the response time from the inputting of said reference signal from said decision means and the signal from said first delay means to said third carrier recovering means till the completion of the phase averaging operation; and
    second phase rotating means for giving a phase rotation by a phase of the signal from said third carrier recovering means to the signal from the second delay means.

* * * * *